United States Patent [19]
Lecreux et al.

[11] Patent Number: 5,888,078
[45] Date of Patent: Mar. 30, 1999

[54] RETRACTABLE SERVICE UNIT

[76] Inventors: Philippe Lecreux, 35, rue Roger-Poulain; Bruno Hibon, 23, rue de Château, both of F-27950 Saint-Marcel, France

[21] Appl. No.: 750,084

[22] PCT Filed: Jun. 7, 1995

[86] PCT No.: PCT/FR95/00734

§ 371 Date: Dec. 9, 1996

§ 102(e) Date: Dec. 9, 1996

[87] PCT Pub. No.: WO95/34113

PCT Pub. Date: Dec. 14, 1995

(Under 37 CFR 1.47)

[30] Foreign Application Priority Data

Jun. 8, 1994 [FR] France .................................. 94 06987

[51] Int. Cl.⁶ .................................................. H01R 13/60
[52] U.S. Cl. .......................................................... 439/131
[58] Field of Search .............................. 439/131; 174/48, 174/57

[56] References Cited

U.S. PATENT DOCUMENTS

| | | | |
|---|---|---|---|
| 2,811,574 | 10/1957 | Guerrero | 439/131 |
| 2,811,575 | 10/1957 | Guerrero | 174/57 |
| 3,433,886 | 3/1969 | Myers | 439/131 |
| 3,646,244 | 2/1972 | Cole | 174/57 |
| 3,794,956 | 2/1974 | Dubreuil | 439/131 |
| 4,059,321 | 11/1977 | Rasmussen et al. | 439/131 |
| 4,511,198 | 4/1985 | Mitchell | 439/131 |
| 4,551,577 | 11/1985 | Byrne | 174/57 |
| 4,747,788 | 5/1988 | Byrne | 439/131 |
| 5,023,396 | 6/1991 | Bartee et al. | 174/57 |
| 5,160,809 | 11/1992 | Yang | 174/57 |
| 5,351,173 | 9/1994 | Byrne | 439/131 |

FOREIGN PATENT DOCUMENTS

| | | |
|---|---|---|
| 862.876 | 5/1978 | Belgium . |
| 2 681 111 | 3/1993 | France . |
| 3 620 349 | 12/1987 | Germany . |
| 92 17 542 | 5/1993 | Germany . |
| 682 961 | 12/1993 | Switzerland . |

*Primary Examiner*—Neil Abrams
*Attorney, Agent, or Firm*—Young & Thompson

[57] ABSTRACT

A retractable service unit for the supply of energy or fluids. The service unit includes a protective box (20) preferably adapted to be sunk in the ground, a casing (14), slides (34) fixed to the casing, lifting means (30) comprising two vertical slideways (32) secured to two parallel walls of the box with the slides (34) being movably located in the slideways (32), jacks (39) extending within the slideways. The jacks (39) may be arranged end to end or may be located in separate slides (34A, 34B) in each slideway in a side by side, staggered manner. In one embodiment, a service connector (170) may be separately extended from the casing (114) using a jack (180) or may be raised together with the casing by jacks (139).

15 Claims, 7 Drawing Sheets

RETRACTABLE SERVICE UNIT

The invention relates to a retractable service unit, principally for the supply of fluids or energy (gas, electricity, water) and/or the control of such supply and/or the measurement of the quantities supplied. The invention can also relate to such a unit comprising the control as necessary for the operation of an urban signal installation as for example the control of an assembly of traffic lights. The invention can relate also to a technical service unit adapted to deliver direct electric current to permit recharging batteries of an electric tractive vehicle. The invention relates more particularly to a structure of a movable and retractable box adapted to shelter equipment for the technical service in question.

Numerous sites are provided or arranged to permit the emplacement of temporary arrangements for electrical connections. By way of non-limiting example, there could be cited places reserved for carnivals or markets, campsites, marinas, exhibition halls, stadia and other sports complexes. In all the cases mentioned above, it can also be desirable to have a distribution network for fluid under pressure, for example pneumatic or hydraulic.

The construction of an energy distribution network, particularly electrical energy, in such places, poses problems of safety and requires surveillance against vandalism. Moreover, if the connection terminals are exposed in a large number, they can constitute an environmental hazard.

Other urban equipments have similar problems, even if they do not relate specifically to the distribution of energy, there can be cited by way of example water, gas or electric meters located outside, in cumbersome and visible casings, before buildings or monuments. Another problem is that of the proliferation of such casings, in pavilion regions, before closures or facades of houses.

Moreover, in an urban setting, it is desirable to protect and hide technical control boxes enclosing controls and other electrical equipment necessary for controlling and synchronizing luminous signals (three-colored lights for example) controlling traffic adjacent an intersection or dangerous site.

Finally, in an urban setting, it is desirable increasingly to promote the use of electric motor vehicles. To do this, it is necessary to provide certain parking places with special connections permitting recharging the batteries of such vehicles. It is thus necessary to provide devices serving as direct current distributors and if desired as parking meters. However, the construction of such a distribution network of direct current is difficult to design because of enormous investments which are required.

The invention relates to a solution satisfying each of the problems stated above.

More particularly, the invention relates to a technical service unit for intermittent usage, of the type comprising a protective box having an opening at its upper portion, sheltering at least one casing enclosing apparatus associated with the technical service in question and means for raising said casing to ensure elevation of the casing from the box, as needed, characterized in that said raising means comprise two vertical hollow slideways that are fixed and secured to two parallel walls of said casing, two sliders that move respectively in the slideways, said casing being attached to these sliders and at least two arrangements of spaced jacks, respectively installed between a fixed bearing point and a structural element connected to said casing.

Preferably, the two slideways are U-shaped and integrated in the structure or the mass of said box and disposed such that their surfaces open toward each other. The box can be preferably of concrete and in this case said. U-shaped profiles are incorporated in the casting of the concrete.

With the basic arrangement as defined above, there is provided a larger space within the box, all else being equal and there can therefore be disposed one or several relatively large casings in a box of relatively small size. Moreover, most of the elements can be mounted in the factory in the box itself and thus transported to the site. It remains only to emplace the box in an excavation at the bottom of which have been provided electric cables and/or the required conduits. Preferably, the box is buried such that its opening, masked by a cover, is flush with the surface of the soil. Unlocking the cover gives rise to automatic rising of the casing, to supply energy or for maintenance, to lift a counter, or for any other operation connected with the technical service in question.

For the particular use in recharging batteries of electric vehicles, the invention is moreover principally remarkable in that it comprises at least one technical casing of the type mentioned above and a network for service arranged beside the technical casing in said protective box, said service network being coupled to a particular lifting arrangement permitting removing the box independently of said technical casing.

In this case, the technical casing can preferably be associated with a lifting system as described above whilst any other system adapted to be mounted in a protective box can be provided. The technical casing can particularly enclose a rectifier supplied by a subterranean alternating current distribution network. The service connection can enclose itself at least one outlet for the distribution of continuous current, connected to the output of the rectifier and if desired telecommunication reception means and/or payment means. The rising of the service connection can thus be controlled by any user of an electrical vehicle (and only by such a one) provided with a suitable telecommunication casing. When not in use as a parking-recharging station, the outlet can be retracted into the protective box and become inaccessible, alongside the street. In this exact context, the invention permits positioning rectifiers adjacent selected. parking spots, typically a rectifier at each parking space.

The invention will be better understood and other advantages of the latter will become apparent in the light of the description which follows of several embodiments of a technical service unit in accordance with its principle, given solely by way of example and with reference to the accompanying drawings, in which.

With reference more particularly to FIGS. 1 to 4, there is shown a service unit 11 for intermittent use, which is to say that can be sunk into the ground 12 (FIGS. 1 and 2) or, on the contrary, be accessible above the ground level (FIGS. 3 and 4) for use, control or measurement of consumption. More particularly, in the example described, the service unit comprises at least one casing 14 comprising or enclosing apparatus relating to the technical service in question, in this case particularly current outlets 16 (single phase and triple phase), fuses or switches (not shown) and an electric meter 17. The electric energy distribution circuits thus defined are connected to a subterranean electrical network 18. This network is accessible at the bottom of the protective box 20, of concrete, sunk in the ground and sheltering the casing. The network is connected to the casing via a flexible electrical cable 21 and shunt box 22 installed in the bottom of box 20. The general shape of the box is a rectangular parallele-piped, and comprises a hole 23 in its bottom wall, provided with a grill for the evacuation of rain water. It also comprises a horizontal opening 24 which is rectangular, in its upper portion. It is sunk such that this opening is flush with ground level, being closed by a cover 26 when not used. This cover is inscribed in the metallic frame 27 fixed in the upper portion of the box 20. Preferably, the external surface of the cover 26 is shaped (thanks to a metallic frame) as a flat receptacle 29 adapted to receive a material or a coating (bitumen, lawn, stone or cement tiles, etc.) suitable for the immediate vicinity of the box. This latter is moreover provided with lifting means 30 to ensure the automatic extraction of the casing 14 from the box, as needed.

Figure 1:
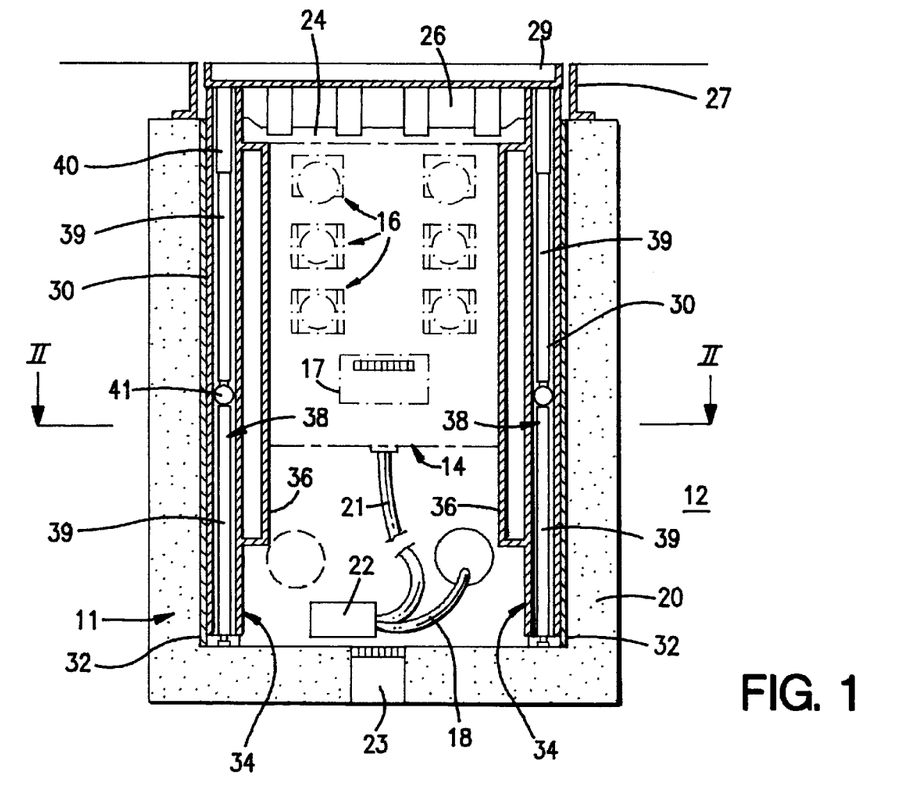
FIG. 1 is a schematic elevational and cross-sectional view of a technical service unit according to the principle of the invention, the casing being shown within the protective box.
Figure 2:
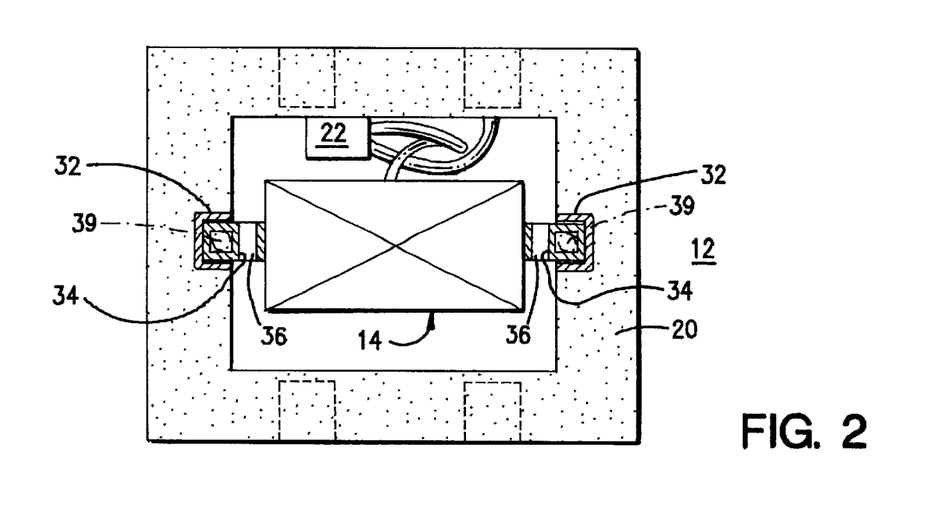
FIG. 2 is a cross section on line II—II of FIG. 1.
Figure 3:
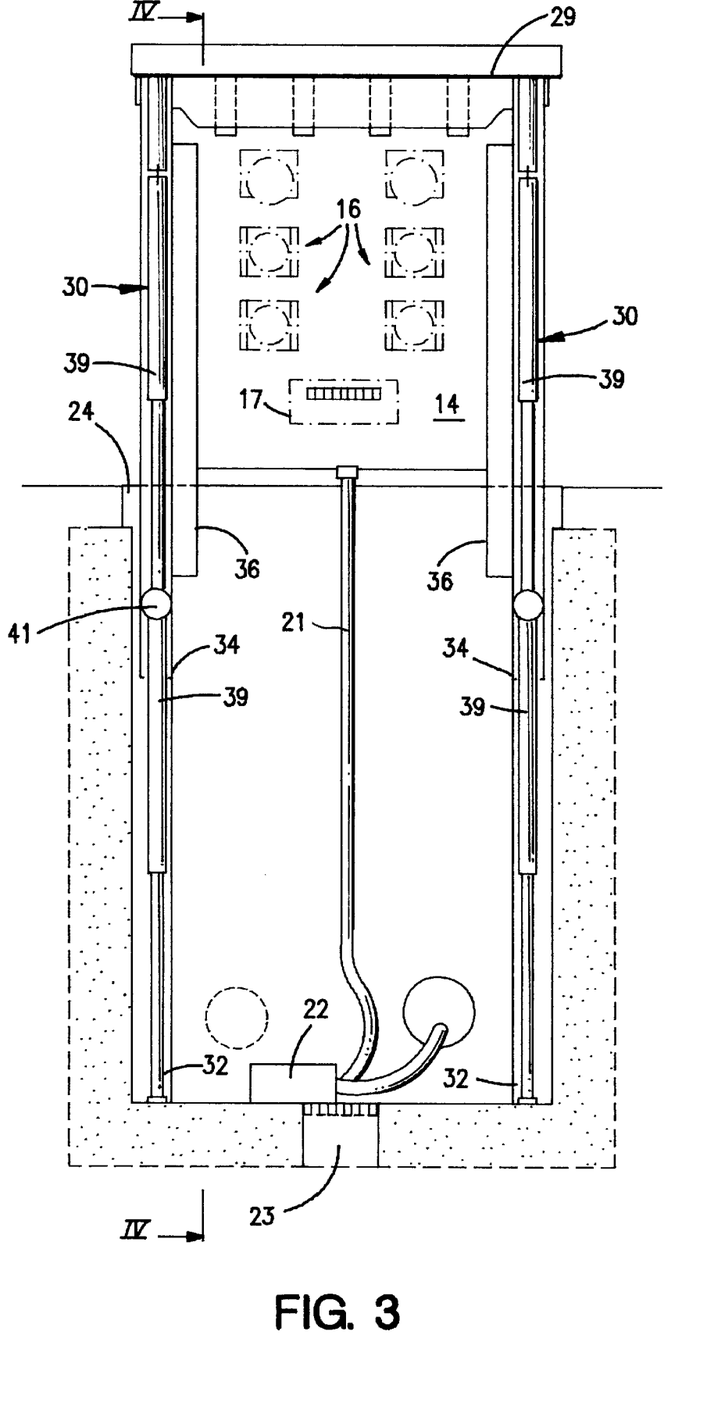
FIG. 3 is a view similar to FIG. 1, the casing being outside the protective box.
Figure 4:
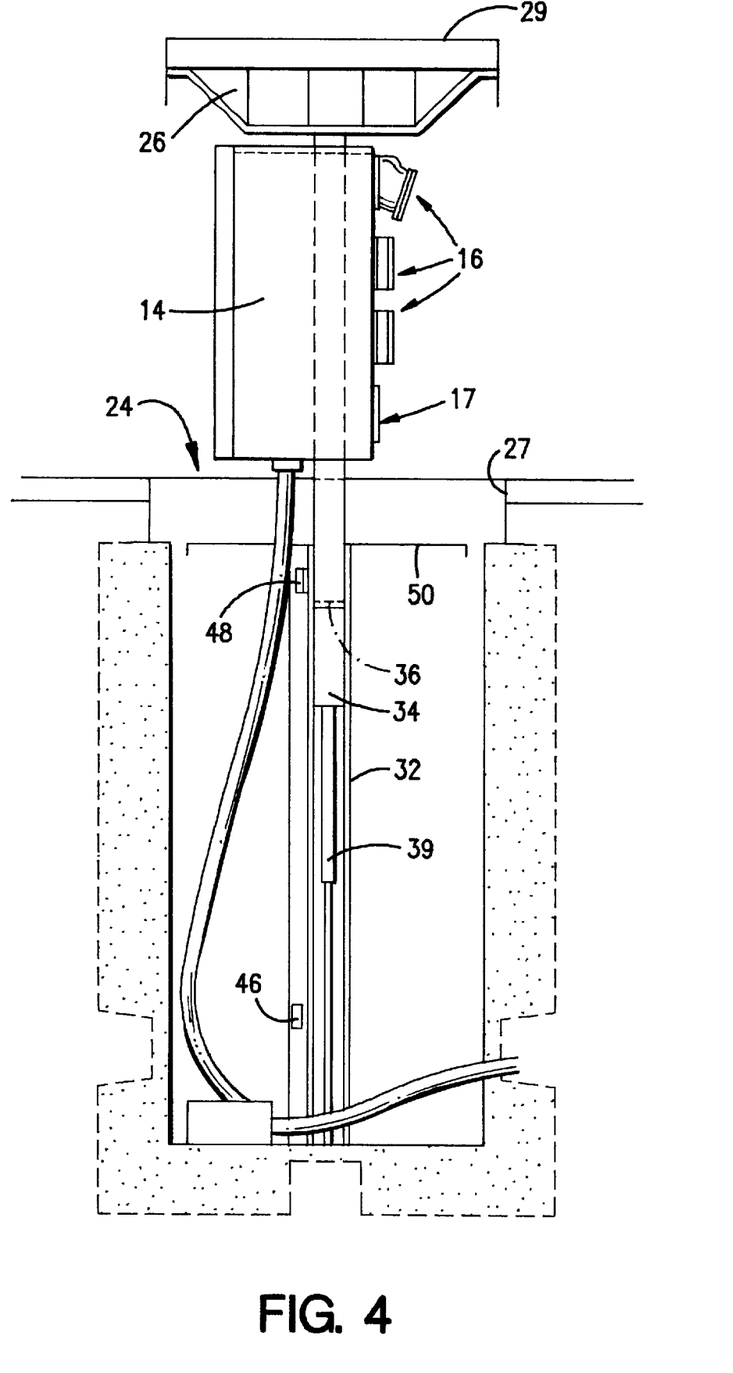
FIG. 4 is a cross section on line IV—IV of FIG. 3.

According to a preferred characteristic of the invention, these lifting means comprise two hollow slideways 32 which are vertical and fixed and secured to two parallel internal walls of the box, and two slides 34, which in this case are tubular and of square cross section, mounted to slide vertically in slideways, respectively. The casing 14 is attached to these slides 34 by lateral connection members 36. The cover 26 is itself fixed (for example welded) to the upper ends of the slides 34. Thus the casing 14 is fixed to the cover by means of slides 34. The system is completed by two arrangements of spaced jack devices 38, each being installed between a fixed bearing point (here the base of the box 20) and a structural element connected to the casing, here the cover 26. Each arrangement of jack devices comprises in this case two jacks 39 mounted end to end and a cross piece 40 to compensate for height. Of course, each arrangement 30 could be constituted by a single jack 39 or on the other hand by more than two jacks 39 mounted in the same way. Preferably said arrangements of jack devices 38 are installed in the tubular slides 34 which contribute to maintain them in vertical position. The two jacks 39 of a same arrangement are connected to each other by a spherical connection member 41, ensuring good guidance within the slide. More precisely, the two slideways 32 are constituted by profiles of U-shaped cross section, integrated into the structure or mass of concrete and disposed such that their open surfaces face each other (FIG. 2). In the case of a concrete box, said U-shaped cross section profiles are incorporated as parts of the coffering, during casting of the concrete. The jacks 39 in this case are pneumatic jacks which extend automatically when the cover 26 is freed. To do this, and with reference to FIG. 4, the device is provided with a lower lock 46 and an upper lock 48 disposed at different levels in the box, for example along one of the slideways 32. These locks coact with a vertical closure rod (not shown in the drawings) manipulable from outside, for immobilizing the movable portions of the system in the two possible positions, one shown in FIG. 1 in which the cover 26 is within its frame 27 and in which accordingly the casing is entirely sunk within the protective box, and the other, shown in FIGS. 3 and 4, in which the casing is completely raised above the box and is hence located so as to be accessible to a user. In this position, a closure plate 50 secured to the lifting means, located below the casing 14, is positioned in the vicinity of the opening 24 of the box 20 to prevent foreign bodies from falling into the box.

Thus, in its non-use position, only the cover 26 is visible; it is not noticeable other than by the contour of the frame 27. The closing of the lower lock 46 maintains the pneumatic jacks 39 in the contracted position. Opening this lock suffices to free the casing which rises automatically at reduced speed to the position shown in FIGS. 3 and 4, thanks to the expansion of the pneumatic jacks. After closing the upper lock, which stabilizes the casing in the use position, the equipment that it contains can be placed in service. To return the casing to the non-use position, it suffices to open the upper lock and to press on the casing to cause it to retract at reduced speed, against the expansion force of the jacks 39, into the box 20 before closing the lower lock 46.

It will be clearly seen from the preceding description that the system which has been described can have many other uses than the simple supply of electricity. The casing can permit the supply of gaseous or liquid fluids, if it is equipped with the necessary connection valves. It can also permit the control of the supply of such primary materials. The casing can shelter an electric meter, a gas meter or a water meter or several of these. In this way, it is no longer necessary to enter into other locations to read the meters and only the persons duly entrusted with the maintenance or reading functions of these meters are in possession of the keys permitting access to the casing of the box. The casing can also enclose the control equipment for signal lights of an intersection. In this case, the casing is accessible only by maintenance persons or traffic officers.

Figure 5:
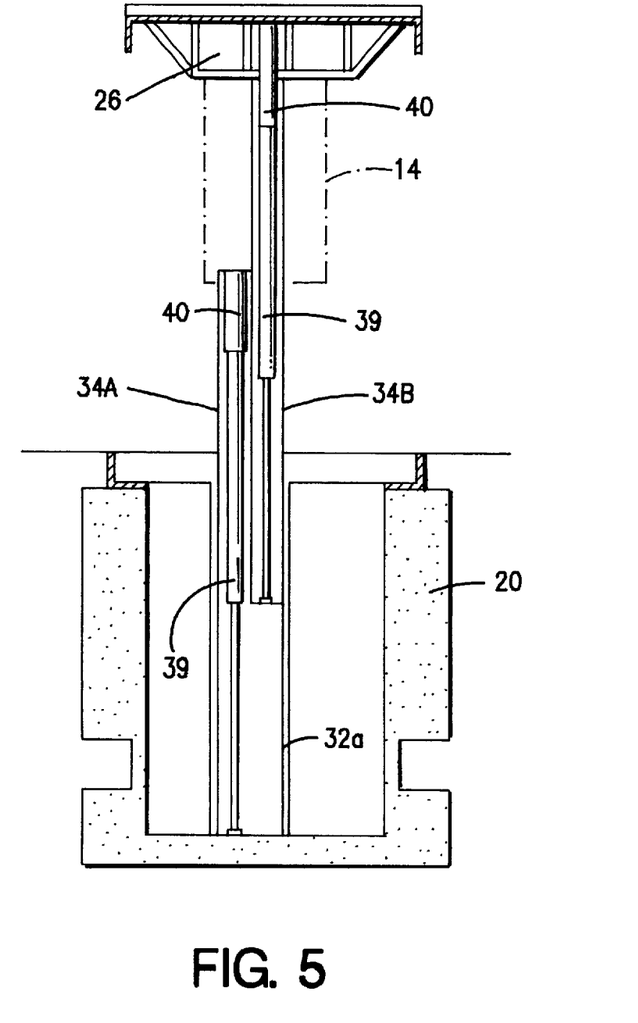
FIG. 5 is a view similar to FIG. 4 showing a modification.

FIG. 5 shows a modification in which analogous elements bear the same reference numerals. According to this modification, each slideway 32a, wider than in the preceding embodiment described, shelters an assembly of two slides 34A, 34B connected to each other, for example welded, and sheltering respectively two jacks 39, one mounted between a fixed bearing point in the bottom of the box and an upper point of said slide assembly and the other mounted between a lower point of said slide assembly and said structural element connected to the casing, namely the cover 26. In this example, each jack 39 is associated with a cross piece 40 for height compensation.

This mounting permits a greater amplitude of displacement of the casing, with reduced encumbrance in height, all else being equal.

Figure 6:
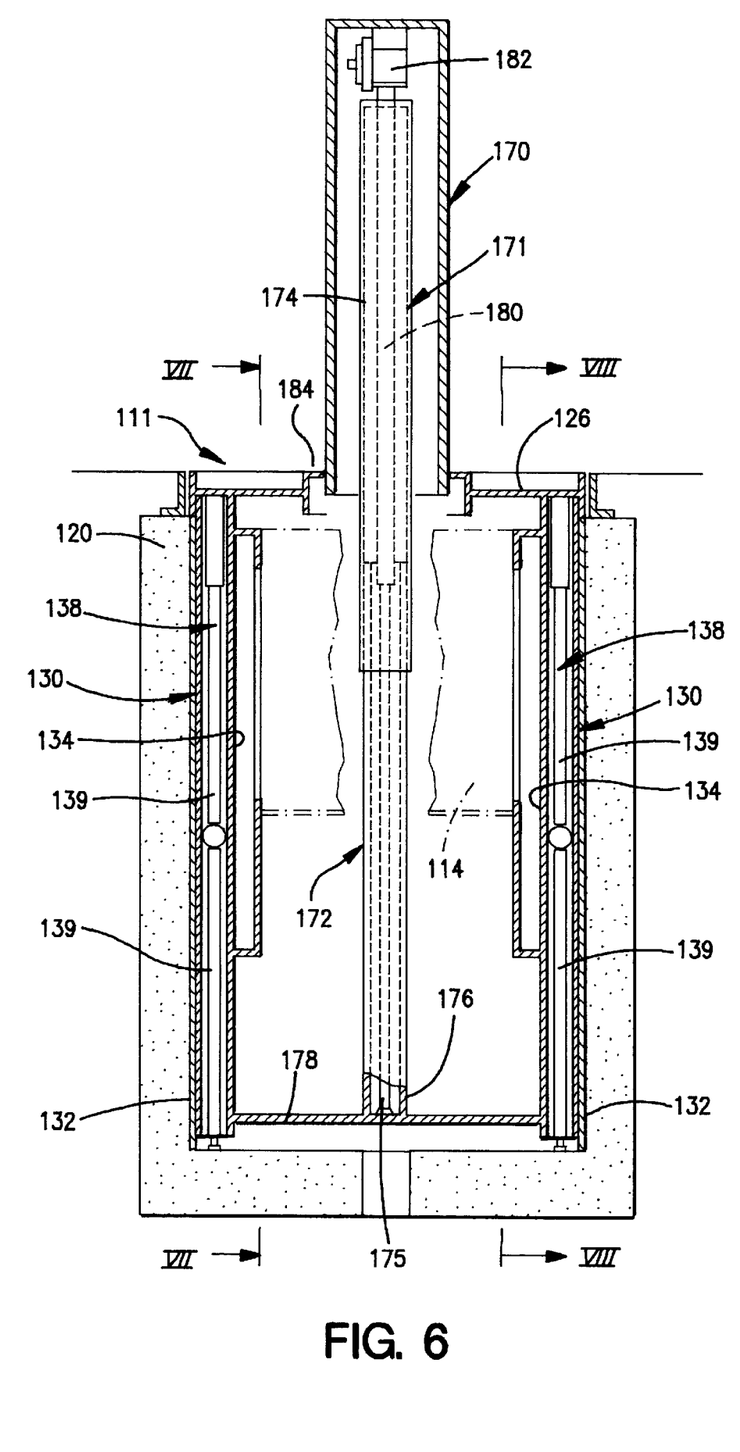
FIG. 6 is a schematic elevational and cross-sectional view of another technical service unit according to the invention, more particularly adapted to the supply of electrical vehicles, the system being shown with the service outlet in use position.
Figure 7:
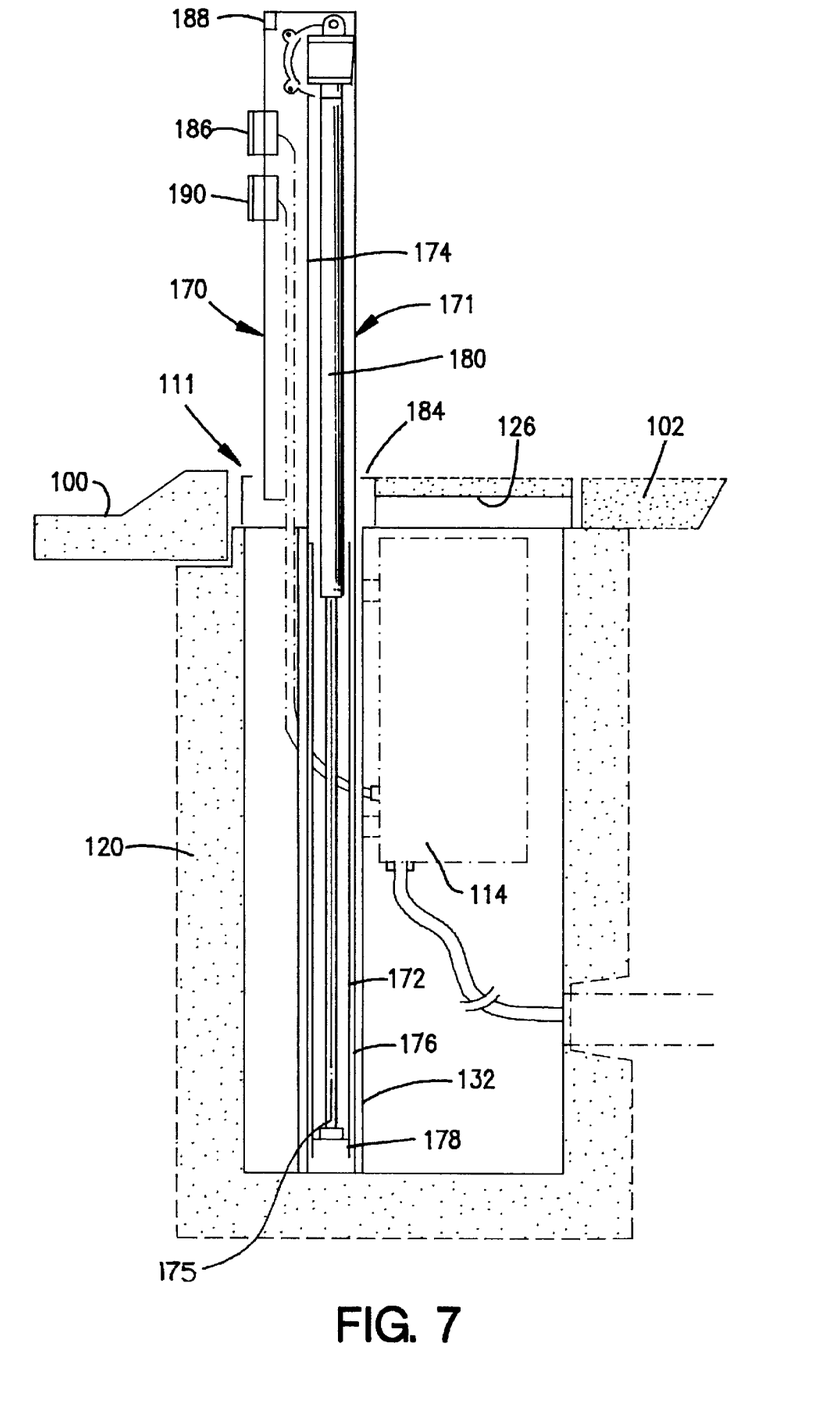
FIG. 7 is a cross-sectional view on line VII—VII of FIG. 6.
Figure 8:
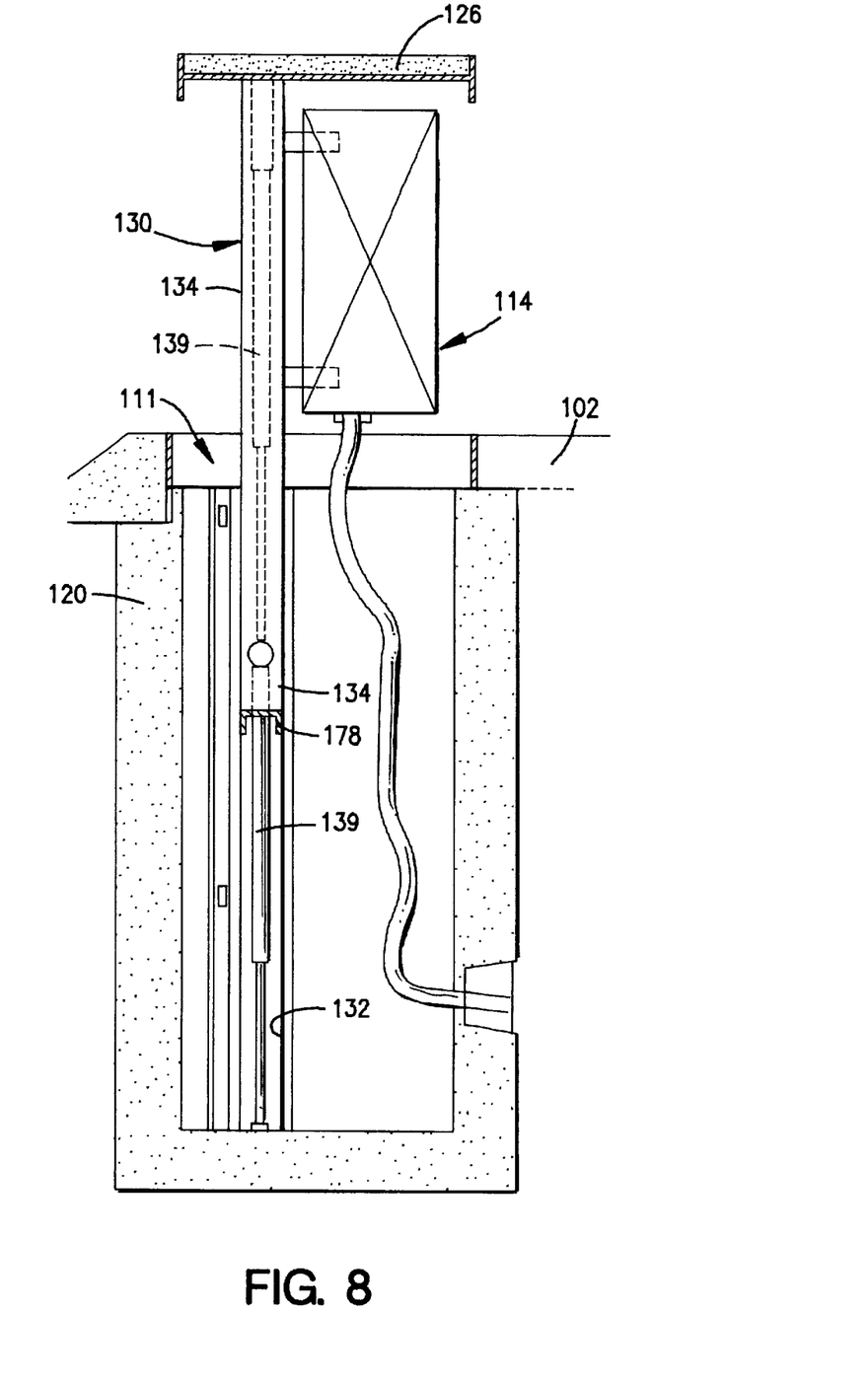
FIG. 8 is a cross-sectional view on line VIII—VIII of FIG. 6, the service casing being shown in an accessible position, outside the protective box.

There will now be described with reference to FIGS. 6 to 8, another service unit 111 according to the invention, more particularly adapted to supply continuous current for electrical vehicles. Such a unit is for example adapted to be implanted along an urban street 100, at the edge of a sidewalk 102. In this embodiment, structural elements analogous to those of the preceding embodiments, have the same reference numerals increased by 100. They will not be described in detail. There is thus a protective box 120 of concrete, a technical casing 114 within this box, a cover 126 closing the upper opening of the box, at the level of the soil and lifting means 130 for the casing 114, comprising slideways 132 of U-shaped cross section integrated with the concrete, slides 134 moving vertically in the slideways and arrangements of jack devices 138 installed in the slides and pressing between the bottom of the box and the cover 126. The slideways are fixed laterally to the casing 114 and their upper ends are welded to the cover 126.

However, this embodiment is notable by virtue of the fact that it comprises moreover a service connection 170 coupled to its own lifting arrangement 171, permitting extracting it from the protective box 120 independently of the technical casing 114. More precisely, the service connection 170 is fixed to a vertical guide system of telescopic structure 172, formed by at least two tubes of different cross section sliding one within the other. One of these tubes, in this case the external tube 174, is fixed longitudinally to the interior of the service outlet. It is welded along the internal surface of the casing of this latter. The other tube of the guide system, here the internal tube 176, is fixed by its lower end to a horizontal cross piece 178. The ends of this cross piece are respectively secured to the lower ends of the slides 134 of the lifting means for the technical casing 114.

The vertical guide system 172 shelters jack 180 which in this case is a screw jack controlled by an electric motor 182 installed in the upper portion of the service outlet. Each portion of the jack is secured to one of the tubes of the vertical guide system with telescopic structure. More particularly, the body of the jack is secured to the external tube 174 whilst the end of jack rod 175 is fixed to the lower end of the internal tube 176 and to the horizontal cross piece 178.

To be able to rise independently of the technical casing, said service outlet 174 is mounted slidably vertically and guided in a horizontal window 184 provided in the cover 126 which is positioned over the opening of the box 120.

The technical casing 114 comprises at least one rectifier supplied by a conventional alternating current distribution network, accessible from within the box. The casing also houses all the control and safety equipment necessary for the operation of such a rectifier. The service outlet comprises itself at least one continuous current distribution outlet 186 connected to be supplied by the rectifier of the technical casing. Preferably, the service outlet also comprises telecontrolled detection means 188 associated with means for controlling the motor of the jack 180. It also comprises payment means 190, by tokens or bank cards.

It will be seen clearly from the preceding description that the service outlet can be raised from the box 120 under the control of a user, without the technical casing 114 and the cover 126 rising. If the parking place is not occupied by an electrical vehicle whose battery requires recharging, the service outlet is retracted within the box 120 and protected against improper movements of vehicles and vandalism. But when a technical intervention is necessary, the technical casing is raised under the same conditions as described above, thereby also causing the rising of the service outlet because the rod of the screw jack 180 is secured to the horizontal cross piece 178 which is itself secured to the lower ends of the slides 134.

We claim:

1. Service unit for intermittent usage, of the type comprising a protective box (20) having an opening at its upper portion, sheltering at least one casing (14) enclosing apparatus connected with the technical service in question and lifting means (30) for said casing to ensure the raising of said casing outside the box as needed, wherein said lifting means comprises, two vertical hollow fixed slideways (32) secured to two parallel walls of the box, two tubular slides (34) movable respectively in the slideways, said casing being secured to these slides, two spaced arrangements of jack devices (38) respectively installed between a fixed point and a structural element (26) connected to said casing, these arrangements of jack devices (38) being installed in the tubular slides.

2. Service unit according to claim 1, wherein the two slideways (34) are U-shaped cross-sectional profiles integrated into said box and disposed such that their open surfaces face each other.

3. Service unit according to claim 2, wherein said casing (20) is of concrete, said U-shaped cross-sectional profiles being incorporated by casting into said concrete.

4. Service unit according to claim 1, wherein said structural element forms a cover (26) which can close the opening of said box.

5. Service unit according to claim 4, wherein said casing (14) is secured to said cover.

6. Service unit according to claim 4, wherein the external surface of the cover (26) is shaped as a flat receptacle (29) adapted to receive a material or a covering suitable for the immediate environment of the box.

7. Service unit according to claim 1, wherein each of said jack devices (38) comprises at least two jacks (39) connected end to end by a connection member (41).

8. Service unit according to claim 1, wherein each of said slideways (32a) shelters an assembly of two slides (34A, 34B) connected to each other and sheltering respectively two jacks (39), one of the jacks (39) being mounted between a fixed bearing point and an upper point of said slide assembly and the other jack being mounted between a lower point of said slide assembly and said structural element (26) connected to the casing.

9. Service unit according to claim 1, further comprising at least one technical casing (114) and one service outlet (170), arranged side by side in said protective box (120), said service outlet being coupled to a raising arrangement (171) permitting raising it from the box independently of the technical casing.

10. Service unit according to claim 9, wherein said service outlet is fixed to a vertical guide system with a telescopic structure formed by at least two tubes (174, 176) of different cross sections sliding one within the other, one of the tubes being fixed longitudinally to the interior of said service outlet.

11. Service unit according to claim 10, wherein the other tube (176) of the guide system is fixed by its lower end to a horizontal cross piece (178) and in that the ends of this cross piece are respectively fixed to the slides (134) of said lifting means.

12. Service unit according to claim 10, wherein said vertical guide system shelters a screw jack controlled by an electric motor (182) installed in said service outlet, each portion of said screw jack being secured to a tube of said vertical guide system with telescopic structure.

13. Service unit according to claim 9, wherein said service outlet is mounted vertically slidably in a horizontal window (184) of the cover (126) which closes the opening of said box.

14. Service unit according to claim 9, wherein said service outlet comprises at least one of a distribution outlet for electrical current (126), telecontrol means (188), and payment means (190).

15. Service unit according to claim 14, wherein said technical casing (114) comprises at least one rectifier supplied by an alternating current distribution network accessible within said box and in that said rectifier is connected to supply said distribution outlet of direct current (186) of said service outlet.

* * * * *